June 13, 1933. W. L. MARDEN 1,913,494
AUXILIARY GEAR MECHANISM FOR METER TRANSMISSION
Filed Sept. 6, 1930
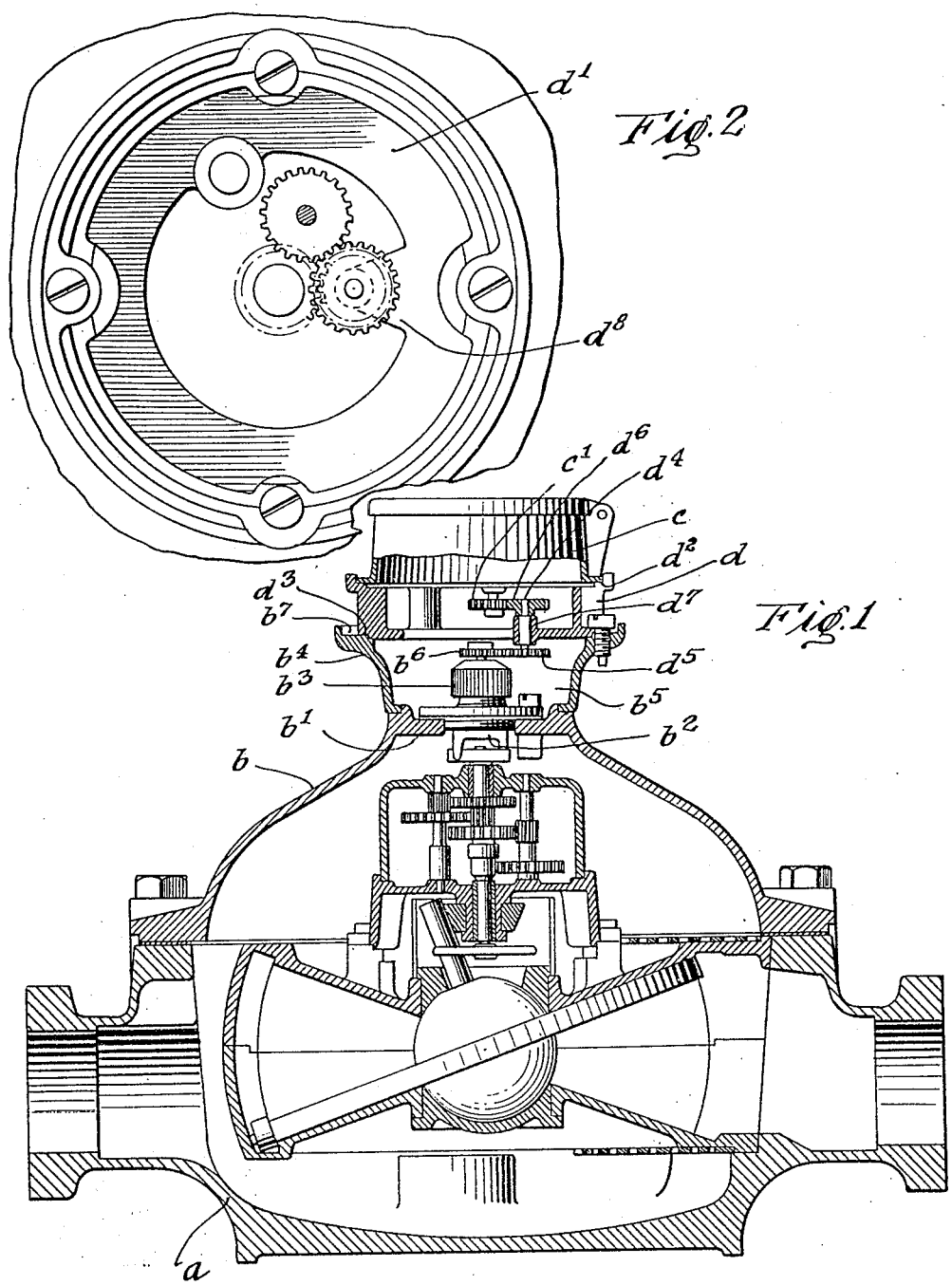
Inventor
William L. Marden
By his Attorneys
Redding, Greeley, O'Shea & Campbell Patented June 13, 1933

1,913,494

UNITED STATES PATENT OFFICE

WILLIAM L. MARDEN, OF ELMHURST, NEW YORK, ASSIGNOR TO NEPTUNE METER COMPANY, OF NEW YORK, N. Y., A CORPORATION OF NEW JERSEY

AUXILIARY GEAR MECHANISM FOR METER TRANSMISSION

Application filed September 6, 1930. Serial No. 480,266.

The present invention relates to meters and embodies, more specifically, an improved auxiliary gear mechanism for the transmission system of a fluid meter, by means of which the gear ratios thereof may be varied to a high degree to adapt the mechanism to receive a great number of sets of gears, thus affording a great range over which correction of the meter may be effected.

More particularly, the invention embodies an auxiliary mechanism which may be applied to a standard form of meter to multiply the gear reduction thereof materially, thus increasing the capacity of adjustment of the meter in correcting for errors in its reading.

Considerable difficulty has been experienced frequently in correcting the reading of a meter to drive the same within the limits prescribed by law and various devices and constructions have been resorted to in an effort to make all meters uniformly and completely adjustable over a wide range of readings. The most desirable and effective way of correcting the reading of a meter is to change the gearing thereof to provide a different ratio between the driving and driven elements. Correcting the mechanism in this fashion insures accuracy in the reading of the meter under all conditions regardless of the rate of flow. It has been found frequently that many meters cannot be corrected in this fashion due to the limited number of sets of gears which may be used interchangeably therein. The different ratios of these sets of gears thus provides an accurate and effective means for correcting the reading of a limited number of meters only.

An object of the present invention, accordingly, is to provide a mechanism for multiplying the range of gear ratios over which the meters may be corrected, thus practically rendering any standard meter of such character as to adapt it for correction, regardless of its characteristics.

A further object of the invention is to provide a device of the above character which may be readily applied to the standard forms of meters without altering the design or construction thereof in the slightest.

A further object of the invention is to provide a device of the above character, the construction of which is simple and inexpensive and which may be readily applied to a meter.

Further objects, not specifically enumerated above, will be apparent as the invention is described in greater detail in connection with the accompanying drawing, wherein:

Figure 1 is a view in vertical section, taken through a meter provided with an auxiliary gear mechanism constructed in accordance with the present invention.

Figure 2 is a plan view showing the auxiliary mechanism of the present invention.

Referring to the above drawing, a meter housing is shown at $a$ having a cover plate $b$ formed with a partition $b'$ through which a driving mechanism $b^2$ extends, a packing nut $b^3$ being provided to seal the joint between the partition and the driving member effectively. The upper portion $b^4$ of the cover $b$ forms a recess $b^5$ in which the packing nut $b^3$ and driving gear $b^6$ are received, the housing being formed with a mounting face $b^7$ upon which a register housing $c$ is secured normally. Register housing $c$ preferably contains suitable registering mechanism of a standard form, the drive thereto being effected by means of a gear $c'$. Normally the gear $c'$ engages gear $b^6$ to perfect the drive in the usual fashion.

When it is desired to change the gear ratio between the driving and driven members, particularly when it has been found that the meter cannot be corrected accurately enough with the limited change afforded by varying sets of gears in the registering mechanism, a device constructed in accordance with the present invention is used. This device consists of an auxiliary housing $d$ formed with an annular flange $d'$ and a mounting face $d^2$ which is similar to the mounting face $b^7$. On the lower extremity of the housing, a face $d^3$ is provided to cooperate with the mounting face $b^7$, thus enabling the auxiliary housing to be inserted between the register housing $c$ and the extension $b^4$ of the cover $b$. An inwardly extending arm $d^5$ is formed on the disc $d'$ and provided with a sleeve $d^7$ within which a shaft $d^4$ is journaled. The shaft thus extends upon the opposite sides of the flange $d'$ and is provided with a gear $d^5$ which engages gear $b^6$ and gear $d^6$ which engages gear $c'$. The ratios between the respective gears $b^6$ and $d^5$ and gears $c'$ and $d^6$ may thus be changed by substituting additional gear sets to effect a desired change in the reduction between the driving and the driven members of the mechanism. In this manner, the capacity of the mechanism for adjustment to correct the inaccuracies of a meter is increased materially without altering the form or design of the parts. The mechanism is readily applied to a meter and is highly effective in providing a desired adjustment, at the same time being inexpensive to manufacture and assemble.

While the invention has been described with specific reference to the accompanying drawing, it is not to be limited, save as defined in the appended claim.

I claim as my invention:

In combination with a meter driving mechanism and the number wheel mechanism thereof, a driving member operated by the driving mechanism, a driven member receiving power from the driving member for operating the number wheel mechanism thereof, housings for the respective members, an auxiliary housing mounted between the first mentioned housings, an arm on the auxiliary housing, a shaft journaled in the arm, and gears on the shaft engaging the driving and driven members respectively.

This specification signed this 28th day of August A. D. 1930.

WILLIAM L. MARDEN.